(12) United States Patent
Riscutia et al.

(10) Patent No.: US 12,197,909 B2
(45) Date of Patent: Jan. 14, 2025

(54) MULTI-MODE IN-CONTEXT SERVICE INTEGRATION

(71) Applicant: Microsoft Technology Licensing, LLC, Redmond, WA (US)

(72) Inventors: Vlad Riscutia, Redmond, WA (US); Maya Rodrig, Seattle, WA (US); Swati Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 17/990,369

(22) Filed: Nov. 18, 2022

(65) Prior Publication Data

US 2024/0168752 A1    May 23, 2024

(51) Int. Cl.
*G06F 8/70*     (2018.01)

(52) U.S. Cl.
CPC ...................................... *G06F 8/70* (2013.01)

(58) Field of Classification Search
CPC .......................................................... G06F 8/70
USPC .................................................. 717/120–140
See application file for complete search history.

(56) References Cited

U.S. PATENT DOCUMENTS

| | | | | |
|---|---|---|---|---|
| 6,052,785 A * | 4/2000 | Lin | .......................... | G06F 21/33 709/225 |
| 6,278,701 B1 * | 8/2001 | Ayyagari | ............. | H04W 52/267 370/335 |
| 6,704,549 B1 * | 3/2004 | Sorrells | ..................... | H03D 7/00 455/102 |
| 7,139,758 B1 * | 11/2006 | Laws | ..................... | G06F 16/217 707/999.009 |
| 7,840,648 B1 * | 11/2010 | Rosenstein | ........... | G06F 16/958 715/705 |
| 8,353,012 B2 * | 1/2013 | Del Real | ............. | G06F 21/6218 726/4 |
| 9,146,930 B2 * | 9/2015 | Tang | ....................... | G06F 16/13 |
| 9,740,794 B2 * | 8/2017 | Bhumkar | ............ | G06F 16/9038 |
| 10,068,238 B2 * | 9/2018 | Rupp | .................. | G06Q 30/0224 |
| 10,268,490 B2 | 4/2019 | Sabharwal | | |
| 10,412,442 B1 * | 9/2019 | Evans | ..................... | A63F 13/20 |
| 11,042,131 B2 * | 6/2021 | Strohmenger | ..... | G05B 19/0426 |
| 11,501,255 B2 * | 11/2022 | Mann | ................ | G06F 16/24564 |

(Continued)

OTHER PUBLICATIONS

Zhai et al, "A Data-Driven Service Creation Approach for End-Users", IEEE, pp. 9923-9940 (Year: 2017).*

(Continued)

*Primary Examiner* — Anil Khatri
(74) *Attorney, Agent, or Firm* — NovoTechIP International PLLC

(57) ABSTRACT

Systems and methods for integrating a third-party service into a host application enable multiple modes of integration of the data from the third-party services into the host application. The multiple modes include a first mode of integration that involves a data connection to a third-party service, a second mode of integration that involves the use of third-party extensions that provide predefined user interface elements for interacting with the third-party service, and a third mode of integration that involves the use of an iFrame element in the host application for hosting the third-party service. The modes may be activated and switched from within the application so that the user does not have to leave the context of the application to interact with the third-party service.

20 Claims, 8 Drawing Sheets

(56) References Cited

U.S. PATENT DOCUMENTS

| | | | |
|---|---|---|---|
| 11,741,508 B2* | 8/2023 | Zito | G06Q 30/0277 |
| | | | 705/14.73 |
| 2014/0047413 A1* | 2/2014 | Sheive | G06F 8/33 |
| | | | 717/110 |
| 2019/0138591 A1* | 5/2019 | Kesher | G06F 16/9558 |
| 2022/0091860 A1 | 3/2022 | Russell | |

OTHER PUBLICATIONS

Backes et al, "Reliable Third-Party Library Detection in Android and its Security Applications", ACM, pp. 356-367 (Year: 2016).*

Radu et al, "Multimodal Deep Learning for Activity and Context Recognition", ACM, pp. 1-17 (Year: 2017).*

Oviatt et al, "Integration and Synchronization of Input Modes during Multimodal Human-Computer Interaction", ACM, pp. 415-422 ( Year: 1997).*

Massaro et al, "Integrating Proactive Mode Changes in Mixed Criticality Systems", IEEE, pp. 1-10 (Year: 2018).*

Wu et al, "Multimodal Integration—A Statistical View", IEEE, pp. 334-341 (Year: 1999).*

"A whole new way to deliver UI", Retrieved From: https://adaptivecards.io/, Retrieved On: Nov. 14, 2022, 4 Pages.

"Let's build from here", Retrieved From: https://github.com/, Retrieved On: Nov. 14, 2022, 14 Pages.

Ennals, et al., "Intel Mash Maker: Join the Web," Sigmod Record, ACM, New York, NY, US, vol. 36, No. 4, Dec. 2007, pp. 27-33, XP058227954, ISSN: 0163-5808, DOI: 10.1145/1361348.1361355 the whole document.

International Search Report and Written Opinion received for PCT Application No. PCT/US2023/033916, mailed on Dec. 19, 2023, 19 pages.

* cited by examiner

MULTI-MODE IN-CONTEXT SERVICE INTEGRATION

BACKGROUND

Cloud-based services provide computing services over the Internet or a dedicated network. These services are typically provided by third parties and may include, but are not limited to, applications for creating, consuming, and/or modifying content, file storage and management platforms, collaboration and communications platforms, and other types of software as a service. With the proliferation of third-party services, users often utilize different cloud-based service providers for different types of services. For example, users may utilize one cloud-based service for task organization, another cloud-based service for storing files (e.g., documents, images, videos, etc.), a different cloud-based service for notetaking, and yet another cloud-based service for collaborating with other users.

One difficulty faced by users when using different cloud-based services is switching between services to perform different tasks. Switching services typically requires that the user switch from one application to another to access the different services. For example, if a user is currently using a collaboration application (e.g., Microsoft Teams and wishes to add content (e.g., data, an image, a document, etc.) from another third-party service to the collaboration application for other users to see, the user would have to leave the current context (i.e., the current user interface experience) to interact with another application to access the other service and retrieve the content. The user would then have to return to the context of the collaboration application to add the retrieved content. Having to frequently switch between different third-party applications to access and/or retrieve content can be an inefficient use of time and resources, as a user would have to leave the context of the current application, open another application to access a different third-party service, locate the desired content, and take steps to incorporate the content into the original application. Having to frequently leave an application context can also adversely impact a user's engagement with the application resulting in a diminished user experience.

To solve this problem, applications have been provided with the capability of integrating one or more third-party services into the application. Different methods of integrating third-party content into applications have been developed, such as data connections, third-party extensions, and iFrame integration. However, each of these methods typically requires a specialized implementation for each third-party service as well as each type of access. As a result, integrating third-party services into an application typically involves selecting one method of integration and developing the code, instructions, functions, parameters, and the like to enable that method of integration. However, each type of integration may result in different levels and/or types of access or interaction with a third-party service. Switching the type of access a host application has to a third-party service has generally not been possible in previously known systems.

Hence, what is needed are systems and methods of integrating third-party services into an application that provide a cohesive developer and user experience with increasing levels of interaction with third-party services without having to leave the context of the host application.

SUMMARY

In one general aspect, the instant disclosure presents a data processing system having a processor and a memory in communication with the processor wherein the memory stores executable instructions that, when executed by the processor, cause the data processing system to perform multiple functions. The functions may include displaying data from a third-party service in a user interface of a host application according to a predefined data connection view. The data connection view is implemented based on a data connection view definition that has been predefined for the third-party service. The data is retrieved from the third-party service using a data connection between the host application and the third-party service. A first predefined interaction with the data connection view and/or the user interface of the host application is detected. In response to detecting the first predefined interaction, at least a portion of the data in the user interface is displayed according to a predefined third-party extension view. The third-party extension view is implemented based on a third-party extension view definition that has been predefined for the third-party service. The third-party extension view definition defines the portion of the data to be displayed in the third-party extension view and at least one user interface snippet in which the portion of the data is to be displayed. A second predefined interaction with the third-party extension view and/or the user interface of the host application is then detected. In response to detecting the second predefined interaction, an iFrame is incorporated into the user interface of the host application. The iFrame points to a web page for the third-party service such that the web page is retrieved and rendered within the iFrame.

In yet another general aspect, the instant disclosure presents a method for integrating a third-party service into a host application. The method includes displaying data from a third-party service in a user interface of a host application according to a predefined data connection view. The data connection view is implemented based on a data connection view definition that has been predefined for the third-party service The data connection view definition defines the data from the third-party service to be displayed in the data connection view and at least one element to display the data in the data connection view within the user interface.The data is retrieved from the third-party service using a data connection between the host application and the third-party service. A first predefined interaction with the data connection view and/or the user interface of the host application is detected. In response to detecting the first predefined interaction, at least a portion of the data in the user interface is displayed according to a predefined third-party extension view. The third-party extension view is implemented based on a third-party extension view definition that has been predefined for the third-party service. The third-party extension view definition defines the portion of the data to be displayed in the third-party extension view and at least one user interface snippet in which the portion of the data is to be displayed.The portion of the data is retrieved from the third-party service by a third-party extension module.

In a further general aspect, the instant application describes a non-transitory computer readable medium on which are stored instructions that when executed cause a programmable device to perform functions. The functions include displaying data from a third-party service in a user interface of a host application according to a predefined data connection view. The data connection view is implemented based on a data connection view definition that has been predefined for the third-party service. The data connection view definition defines the data from the third-party service to be displayed in the data connection view and at least one element for displaying the data in the data connection view within the user interface. The data is retrieved from the third-party service using a data connection between the host application and the third-party service. A first predefined interaction with the data connection view and/or the user interface of the host application is detected. In response to detecting the first predefined interaction, at least a portion of the data is displayed in the user interface according to a predefined third-party extension view. The third-party extension view is implemented based on a third-party extension view definition that has been predefined for the third-party service. The third-party extension view definition defines the portion of the data to be displayed in the third-party extension view and at least one user interface snippet in which the portion of the data is to be displayed. The portion of the data is retrieved from the third-party service by a third-party extension module. A second predefined interaction with the third-party extension view and/or the user interface of the host application is then detected. In response to detecting the second predefined interaction, an iFrame is incorporated into the user interface of the host application. The iFrame points to a web page for the third-party service such that the web page is retrieved and rendered within the iFrame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
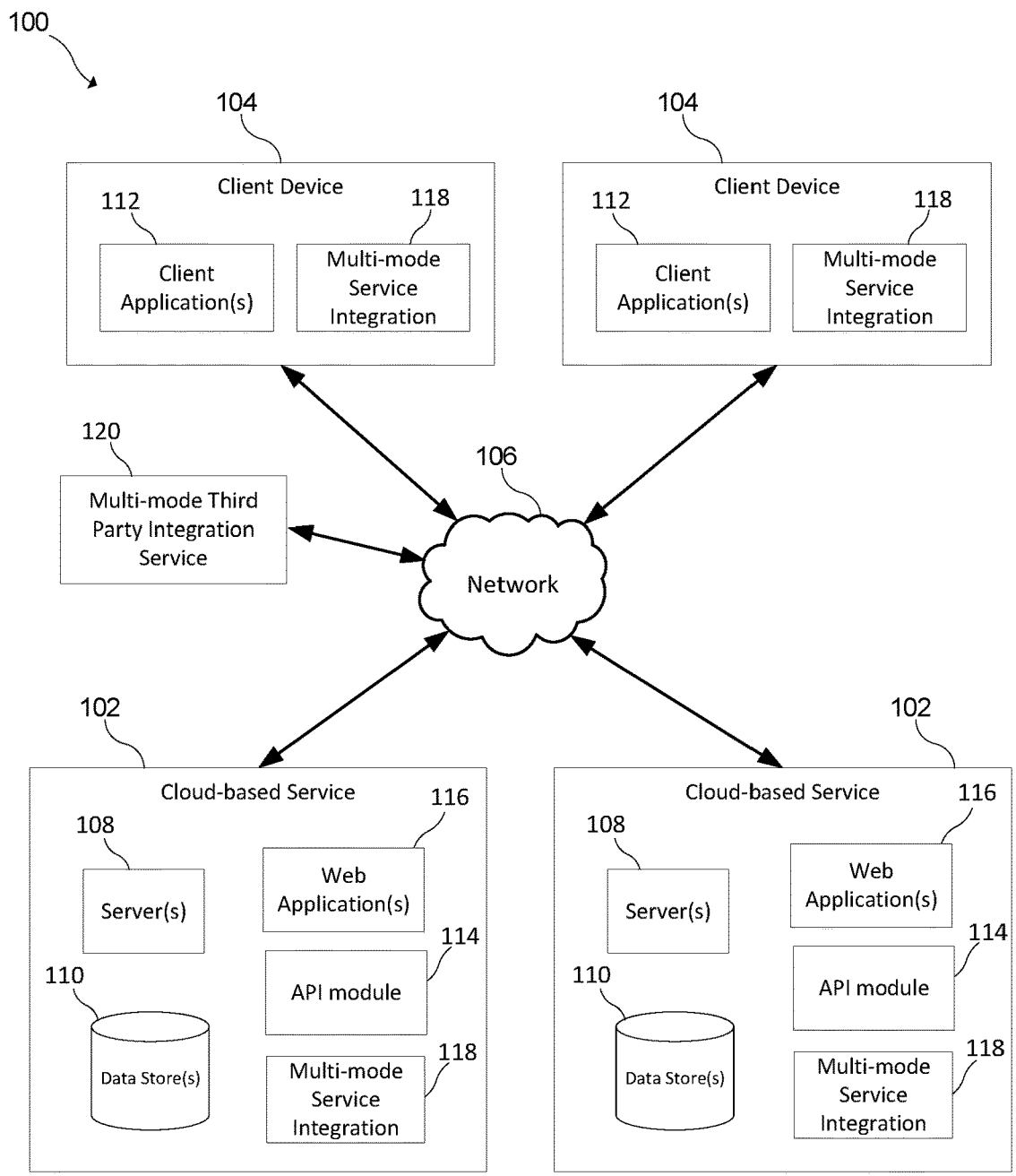
FIG. 1 depicts an example system upon which aspects of this disclosure may be implemented.

Users typically utilize multiple different online services and applications to perform different tasks. However, some tasks may require the use of multiple different online services or applications. This is especially true in a work environment. Users may have to access a collaboration application to interact with coworkers, an online storage service for accessing documents, a project management service for organizing projects and tasks, etc. Because different services and applications are provided by different third parties, there is typically not an easy way to integrate these applications and services. As a result, a user may have to switch from one application to another multiple times while performing a task. For example, if a user is currently using a collaboration application (e.g., Microsoft Teams and wishes to add content (e.g., data, an image, a document, etc.) from another third-party service to the collaboration application for other users to see, the user would have to leave the current context (i.e., the current user interface experience) to interact with another application to access the other service and retrieve the content. The user would then have to return to the context of the collaboration application to add the retrieved content. Having to frequently switch between different third-party applications to access and/or retrieve content can be an inefficient use of time and resources, as a user would have to leave the context of the current application, open another application to access a different third-party service, locate the desired content, and take steps to incorporate the content into the original application. Having to frequently leave an application context can also adversely impact a user's engagement with the application, resulting in a diminished user experience.

To solve this problem, applications have been provided with the capability of integrating one or more third-party services into the application. One method of integrating third-party services is by connecting directly to the service to access the data/functionality provided by the service. This may be performed by implementing an application programming interface (API), a software development kit (SDK), libraries, functions, and the like for accessing at least some of the functionality provided by the services. One advantage of this type of integration is that the third-party service can be integrated into the context of the current application so that a user does not have to leave the context of the application to access the third-party service. However, this integration may be limited. For various reasons (e.g., proprietary, security, and the like), a service provider may not wish to provide access to all of the functionality provided by the service and/or access to all of a user's data, information, or content via a separate application. In some cases, service providers may provide access to a limited subset of functionality and/or user data via a separate application. Even if a service did allow full control via an API, it may not be feasible to try and integrate all of the functionality provided by the service into a predefined schema the application understands.

Another method of integrating third-party services into an application is through the use of predefined user interface elements. For example, user interface elements are typically based on a predetermined collaboration between the third-party service and the application which desires to integrate the third-party service, so that the user interface elements are provided in a format that enables the look of the user interface element to be controlled by the application while access to the data/functionality of the third-party service is still controlled by the service. Different user interface elements may be provided for accessing different functionality of the service. The user interface elements are typically used to enable quick inline actions with the third-party service from within the application. This method of integration therefore may enable more functionality than the connection method described above. However, the application has less control of the context of the integration and there still may be limitations on what can be displayed and/or what actions users can take.

Another method of integrating third-party services into an application is through the use of an inline frame ("iFrame") that is incorporated into an application for hosting the third-party service. As used herein, the term "iFrame" refers to an HTML element that represents a nested browsing context in which one document, such as an HTML page, is embedded in another HTML document. An iFrame includes a frame and has a 'src' attribute that is used to specify the address (e.g., URL address) of the document which is to occupy the frame. The iFrame can utilize the address of a web application for the third-party service as a source so that the web application is essentially incorporated into the application. This type of integration gives full access to the data/functionality of the third-party service. However, the look and feel of the iFrame content will typically be inconsistent with the look and feel of the surrounding application. In addition, the iFrame itself may require a significant amount of screen real-estate. As a result, interacting with the third-party service in an iFrame may essentially take the user out of the context of the application in which the iFrame is integrated.

Integrating third-party services into an application typically involves selecting one method or type of integration and developing the code, instructions, functions, parameters, and the like to enable that method of integration. However, each type of integration may result in different levels and/or types of access or interaction with a third-party service. For example, the first mode of integration discussed above enables third-party data/content to be integrated in the host application with the same look and feel as the host application and with a desired arrangement/configuration, but the functionality is limited. The second mode of integration enables third-party data/content to be integrated and arranged in the host application as desired, but the third-party data/content that is allowed to be integrated into the application is decided upon and controlled by the third-party. The functionality enabled by the second mode of integration may be greater than the functionality enabled by the first mode of integration, but the functionality may still be limited relative to the full functionality provided by the third-party service. The third mode of integration enables the full functionality of the third-party service, but the style of the web page of the third-party service likely does not match the style of the surrounding application and the iFrame view may encompass most of the screen real-estate and obscure the underlying host application. Furthermore, switching the type of access a host application has to a third-party service has generally not been possible in previously known systems.

To address these technical problems and more, in an example, this description provides technical solutions in the form of a multi-mode in-context service integration system that enables multiple levels or modes of integration of third-party services into a host application. The multiple modes of integration include a first mode of integration that involves a data connection to a third-party service, a second mode of integration that involves the use of third-party extensions that provide predefined user interface elements for interacting with the third-party service, and a third mode of integration that involves the use of an iFrame element in the host application for hosting the third-party service.

In use, data/content from a third-party service is initially integrated at the first level of integration with a data connection view based on a data connection to the third-party service which enables limited interaction with the data/content of the third-party service. The multi-mode in-context service integration system enables transitions from the data connection view to either the user interface element view or the iFrame view to increase the level of integration and the corresponding functionality enabled by the different levels of integration. In embodiments, transitions are enabled between all of the views provided by the different modes of integration. Transitions are enabled in any suitable manner. In embodiments, transitions between views are enabled by selectable user interface controls, such as buttons, menu items, etc., provided in the user interface of the host application. As one example, clicking on a data item in a data connection view (i.e., first mode of integration) can cause a transition to third party extension view, such as a card view, that enables further functionality for interacting with the data item. User interface control elements, such as buttons, menus, context menus, prompts, and the like, may be used to enable transitions from each mode to at least one other mode and, in some cases, to all the other modes, depending on the application and needs or desires of the developer.

The benefits and advantages provided by the multi-mode in-context service integration in accordance with this disclosure include, but are not limited to, a technical solution to the technical problems associated with interacting with data/content managed by third-party services while using a host application. The benefits and advantages include providing a cohesive developer and user experience with increasing levels of interaction with third-party services without having to leave the context of the host application. The benefits made available by these technology-based solutions enhance the user's experience and efficiency in interacting with third-party services.

FIG. 1 shows an example computing environment 100, upon which aspects of this disclosure may be implemented. The computing environment 100 includes cloud-based services 102, client devices 104 and a network 106. In the example shown in FIG. 1, each cloud-based service 102 (also referred to herein as a "third-party service") is configured to provide one or more services to users via the client devices 104. Cloud-based services 102 include web applications 116 that enable users to access and interact with the services provided by the cloud-based services. These services include, but are not limited to, web applications for creating, consuming, and/or modifying content, file storage and management platforms, collaboration and communications platforms, and other types of software as a service.

Each cloud-based service 102 may include numerous servers, network devices, storage elements and other components to support the various services that are provided by the cloud-based service 102. For example, each cloud-based service 102 includes one or more servers 108 which are configured to provide computational and/or storage resources for at least a portion of the services provided by the cloud-based service 102. Each cloud-based service 102 hosts data and/or content for multiple users and makes this data and/or content available to the users via client devices 104. User data and/or content is stored on one or more data stores 110.

Client devices 104 are computing devices that are implemented as a portable electronic device, such as a mobile phone, a tablet computer, a laptop computer, a portable digital assistant device, a portable game console, and/or other such devices. The client devices 104 may also be implemented in computing devices having other form factors, such as a desktop computer, vehicle onboard computing system, a kiosk, a point-of-sale system, a video game console, and/or other types of computing devices. Each client device 104 includes one or more client (software) applications 112 that are executed on the client device 104 and that enable access to the services provided by the cloud-based services 102. In some embodiments, client applications 112 comprise a web browser for accessing and displaying data and/or content from the cloud-based services 102. In other embodiments, client applications 112 are local applications programmed to communicate and interact with the cloud-based services 102.

The client devices 104 communicate with the cloud-based services 102 via the network 106. The network 106 may be a dedicated private network and/or the combination of public and private networks commonly referred to as the Internet. Cloud-based services include an application programming interface (API) module 114 that defines one or more APIs via which client applications 112 can communicate with the cloud-based services 102. An API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture. APIs enable client applications 112 to access and use one or more functions, methods, procedures, data structures, classes, and/or other services provided by the cloud-based services.

The system of FIG. 1 includes a multi-mode in-context service integration system that enables multiple modes of integration of cloud-based services 102 into client applications 112 without requiring a user to leave the context of the client application. In the embodiment of FIG. 1, the functionality of the multi-mode in-context service integration system is implemented at least in part in client applications on the client device 104 and/or in web applications 116 for cloud-based services 102 by multi-mode in-context service integration module 118. In embodiments, some or all of the functionality of the multi-mode in-context service integration system is implemented in modules 118 or in a multi-mode third-party integration service 120.

Figure 2:
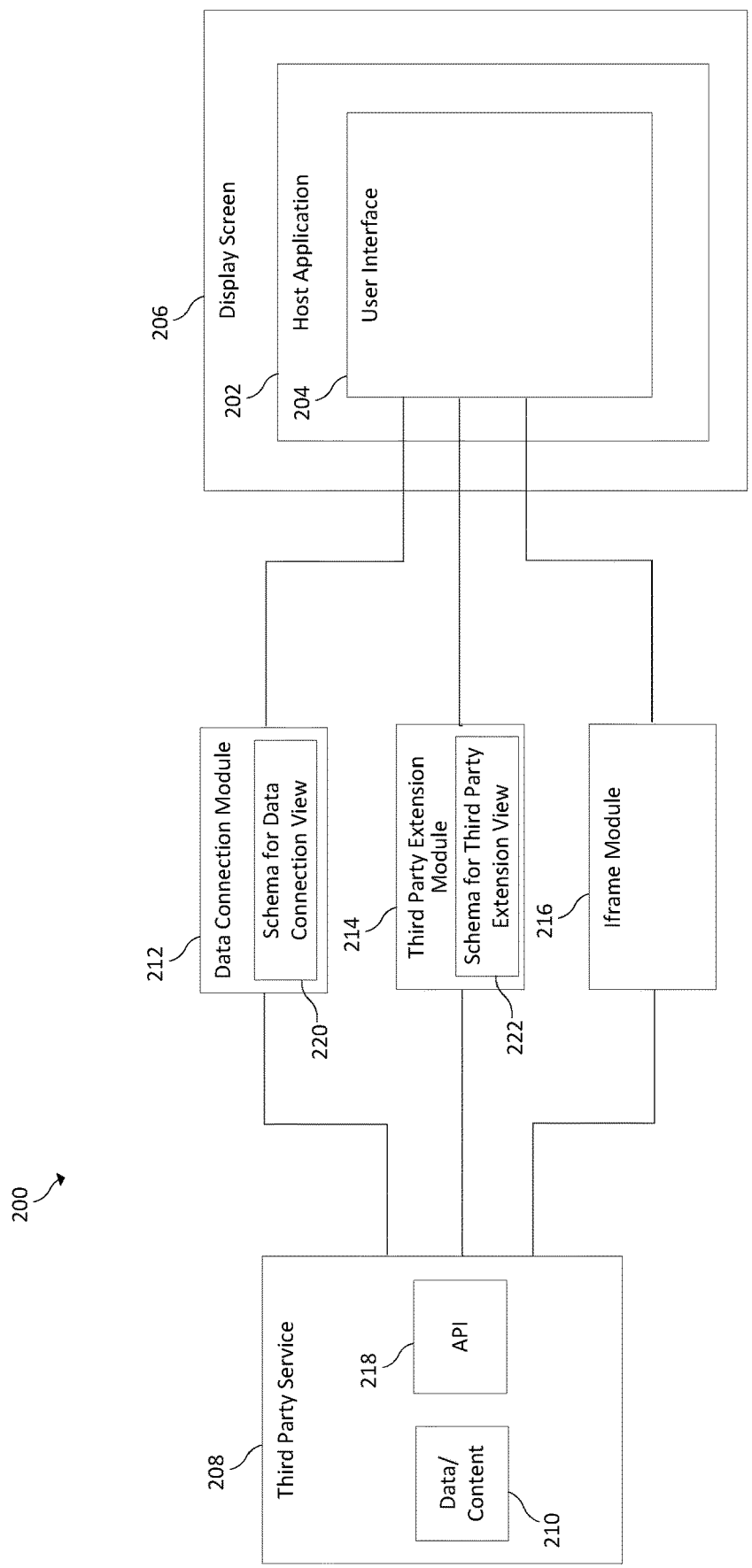
FIG. 2 depicts an example of a multi-mode in-context service integration system for use in integrating cloud-based services into host applications.

FIG. 2 shows an example implementation of a multi-mode in-context service integration system 200. The system 200 includes a host application 202, at least one third-party service 208, a data connection module 212, a third-party extension module 214, and an iFrame module 216. As used herein, the term "host application" is used to refer to any application capable of integrating data/functionality of a third-party service including but not limited to a desktop application, web application, web page, or another iFrame. In some embodiments, the host application 202 comprises a client application provided on a client device and/or a web application provided by a cloud-based service. In some embodiments, the host application 202 comprises a collaboration application, such as MICROSOFT® TEAMS®, that enables collaboration with other users via a network. In other embodiments, the host application 202 comprises any application capable of displaying, creating, consuming, and/or modifying content from a third-party service. The host application 202 includes a user interface 204 that enables a user to interact with the host application 202 using an input device (not shown), such as a keyboard, mouse, and the like. The user interface 204 is displayed on a display screen 206.

As used herein, the term "third-party service" refers to a cloud-based service that provides computing services over a network, such as the Internet. The third-party service 208 of FIG. 2 provides one or more services, such as creating, consuming, and/or modifying content, file storage and management platforms, collaboration and communications platforms, and other types of software as a service. Third-party service 208 stores and/or manages content and/or data 210 for one or more users. As used herein, the terms "data", "user content," and "content" are used to interchangeably refer to a user's data, records, files, documents, images, videos, audios, notes, and other information stored/managed by one or more third-party service(s).

The multi-mode in-context service integration system 200 enables multiple levels, or modes, of integration of services provided by the third-party service 208 into the host application 202. The multiple modes of integration include a first mode of integration that involves a data connection to the third-party service 208, a second mode of integration that involves the use of third-party extensions that provide predefined user interface elements for interacting with the third-party service 208, and a third mode of integration that involves the use of an iFrame element in the host application 202 for hosting the third-party service. The multi-mode in-context service integration system 200 enables transitions between modes as needed for increasing or decreasing levels of access/interaction with the third-party service as needed and/or desired by a user.

To implement the first mode of integration, the multi-mode in-context service integration system 200 includes a data connection module 212 that enables data connections to the third-party service 208 to be established for the exchange of data between the host application 204 and the third-party service 208. In embodiments, a data connection between the host application 202 and the third-party service 208 is enabled using one or more APIs, software development kits (SDKs), libraries, schemas, and the like. For example, in the embodiment of FIG. 2, the third-party service 208 includes an API 218 for accessing the service, retrieving data/content from the service, updating data/content in the service, and accessing other functionality provided by the service. In embodiments, data connection module 212 is configured to utilize function calls, API calls, and the like to interact with the third-party service 208 in a desired manner. The data connection module 212 includes the requisite code, instructions, parameters and the like for making the function calls or API calls to interact with the data/content of the third-party service 208.

To facilitate the data connection mode of integration, a predefined schema 220 is used to define the data types and data attributes implemented in the third-party service 208, the vocabulary/terminology utilized to refer to the data types and attributes, data structures for communicating information pertaining to the data, graphic elements for displaying data, actions that can be performed on data, methods of invoking the actions, and the like. In embodiments, different data connection views for the third-party service 208 are defined using the schema 220 to enable a desired data view and/or functionality for the third-party service 208. The schema 220 enables data from the third-party service to be organized and mapped to desired elements within the user interface 204 of the host application 202. In embodiments, a separate schema is defined for different third-party service. Each schema is specific to the type of service and/or data provided by the third-party service for which it was defined.

Figure 3:
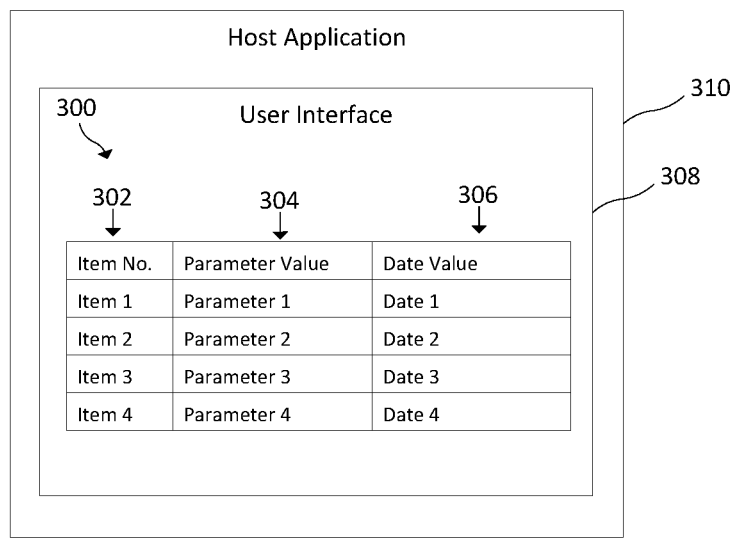
FIG. 3 shows an example implementation of a data connective view for the system of FIG. 2.

In embodiments, data connection views are displayed in connection with one or more predefined graphic elements that are used to aggregate, organize, and/or arrange data items for display in the host application. In embodiments, the one or more graphic elements for displaying the data/content from the third-party service include frames, windows, tables, and the like. The predefined schema enables the data from the third-party service to be mapped to the graphic elements to present the data according to preferences. A simplified example of a data connection view 300 is shown in FIG. 3 for displaying third-party data in a user interface 308 of a host application 310. The data connection view 300 comprises a graphic element in the form of a three-column table for displaying data from the third-party service 208. In the embodiment of FIG. 3, a schema for the data connection view defines data item identifiers (e.g., item no.), parameter values, and date values associated with each data item. The data connection view defines the data items to be mapped into each column of the table. In FIG. 3, the data items include item identifiers that are mapped to an item no. column 302 of the table, parameter values associated with the data items that are mapped to the parameter column 304 of the table, and date values associated with the data items that are mapped to the date value column 306.

In embodiments, different data connection views are predefined for enabling interactions with data and/or content provided by the third-party service. Different data connection views may be defined for different third-party services. For example, a data connection view may be defined for generating a list of items from a third-party service, such as a list of pull requests from Github or a list of tasks from a task service, such as Trello. In addition, different data connection views may be defined for different types of data and/or content provided by a third-party service. In embodiments, one or more predefined data connection views pertaining to one or more third-party services may be selected for integration into a host application to provide functionality for different applications.

In embodiments, the data connection view enables functionality for interacting with the data provided in the data connection view. For example, the data connection mode for a third-party service may allow limited interactions with certain data items. In implementations, the data connection view for a task list may enable predefined interactions with the data in the data connection view. For example, in the case of a data connection view including a task list, the data connection view enables user interactions with the list, such as providing indications of task completions, adding tasks to the list, deleting tasks from the list, and the like. In embodiments, the interactions with the data connection view are enabled in part by the APIs defined by the third-party service. In embodiments, the changes to the data connection view that are enabled by the third-party service are performed by making the appropriate API calls to the third-party service. The data connection module includes the code and/or instructions for detecting predefined user interactions with the data in the data connection view and for making the appropriate API calls based on the detected interactions with the data in the data connection view.

Referring again to FIG. 2, one or more data connection views are defined for interacting with data provided the third-party service 208. The data connection module 212 is configured to cause the one or more data connection views to be created and rendered in the user interface of the host application. In embodiments, the one or more data connection views are rendered in the same style as the surrounding elements of the user interface of the host application. The style of the user interface includes various elements which define the look and feel of the host application, such as color palette, fonts, sizes of fonts, types of controls, sizes of controls, and the like. Rendering the data connection views in the same style as the host application enables data from third-party services to be integrated seamlessly which can enhance the user experience and promote engagement with the host application and/or third-party service.

To implement the second mode of integration, the multi-mode in-context service integration system 200 includes a third-party extension module 214 that enables user interface (UI) snippets (e.g., cards, gadgets, widgets, etc.) provided by third-party extensions to be incorporated into the host application 202. For example, third-party extensions implemented by the third-party service or other parties associated with the third-party service can design UI snippets that enable predetermined interactions with the third-party service with which it is associated. For example, a UI snippet may be configured to retrieve and display certain data/content from the third-party service, enable a search of the data/content of the third-party service, add/delete data/content from the third-party service, and the like.

In embodiments, the third-party extension views are defined according to a predetermined schema 222 which has been defined and agreed upon by developers of one or both of the third-party service and the host application. Similar to the data connection view, the schema defined for the third-party extension view defines data types and data attributes used to describe data in the third-party service, the vocabulary/terminology utilized to refer to the data types and attributes, data structures for communicating information pertaining to the data, actions enabled by UI elements, controls for implementing actions, and the like.

In embodiments, third-party extension views are defined by view definitions which are provided in a structured file format, such as JavaScript Object Notation (JSON). The view definition defines the data from the third-party service to be displayed in the UI element, one or more UI elements for displaying the data, one or more actions to be performed on the data, one or more UI controls for causing the actions to be performed on the data, etc. The third-party extension module 214 receives view definitions and is configured to create and render third-party extension views in the user interface 204 of the host application 202 based on the view definitions.

Figure 4:
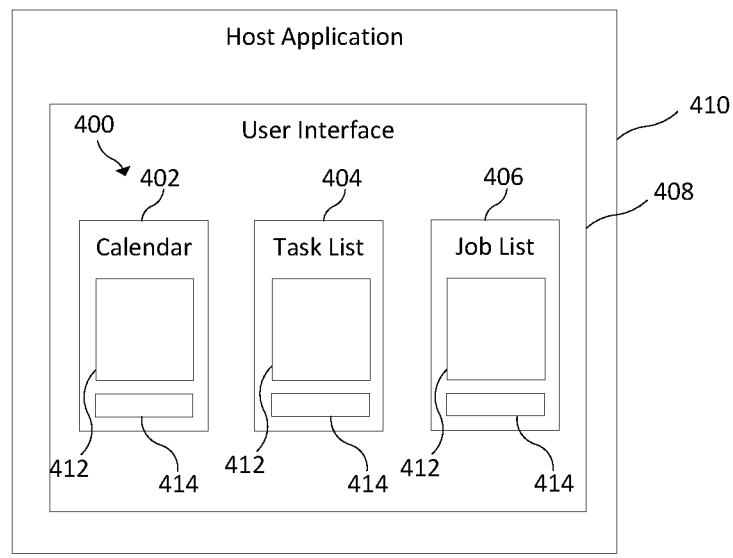
FIG. 4 shows an example implementation of a third-party extension view for the system of FIG. 2.

The third-party extension module 214 includes code, instructions, functions and the like for creating and rendering the UI snippets in the user interface 204 of the host application 202 in accordance with the view definition. In embodiments, a plurality of view definitions are defined for a given third-party service with each view definition enabling a different view and/or interaction with the data provided by the third-party service 208. Different view definitions may be defined for different third-party services. An example implementation of a third-party extension view 400 is shown in FIG. 4. The third-party extension view 400 includes example implementations of UI snippets 402, 404, 404 which are displayed in a user interface 408 of a host application 410. The UI snippet 402 is used to display calendar data which may be retrieved from a calendar application. The UI snippet 404 is used to display a task list which may be retrieved from a task service, such as Trello. The UI snippet 406 is used to display a job list retrieved from a service, such as GitHub. The UI snippets 402, 404, 406 include a UI element 412 for displaying the data associated with the snippet and a control element 414 for performing actions on the data.

In embodiments, third-party extension views have limited ability to define the style for displaying the data and/or UI snippets within the view. The third-party extension views are therefore displayed in the same style as the surrounding elements of the user interface 204 of the host application 202. Thus, the view definitions enable views to be created and rendered quickly and easily in a host application and in the same style as the surrounding elements of the host application while at the same time enabling the data/functionality of the third-party service to be controlled by the developers for third-party service.

Figure 5:
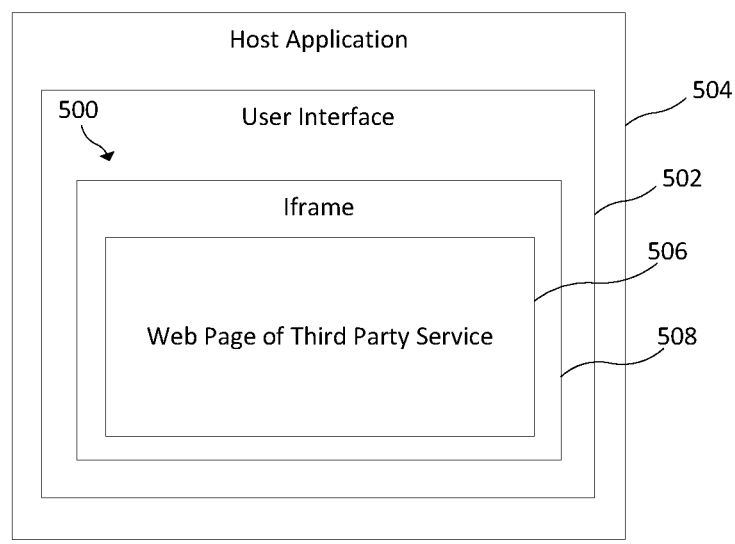
FIG. 5 shows an example implementation of an iFrame view for the system of FIG. 2.

Referring to FIG. 2, to implement the third mode of integration, the multi-mode in-context service integration system includes an iFrame module 216 that enables one or more iFrames to be incorporated into the user interface of the host application for providing an iFrame view of the third-party service. In embodiments, the iFrame includes a source attribute which identifies an address for a web page to be loaded into the iFrame. The service iFrame module is configured to cause an iFrame to be incorporated into the user interface of the host application with a source attribute identifying a web page for the third-party service as the source for the iFrame. The web page for the third-party service is then retrieved and rendered in the iFrame in a known manner. An example of an iFrame view 500 is shown in FIG. 5. The iFrame view 500 is incorporated into a user interface 502 of a host application 504. The iFrame view 500 includes an iFrame element 508 which points to a web page 506 for the third-party service. The iFrame view enables access to the full functionality of the third-party service. However, the style of the web page loaded into the iFrame is independent from the style of the surrounding elements of the host application.

Figure 6:
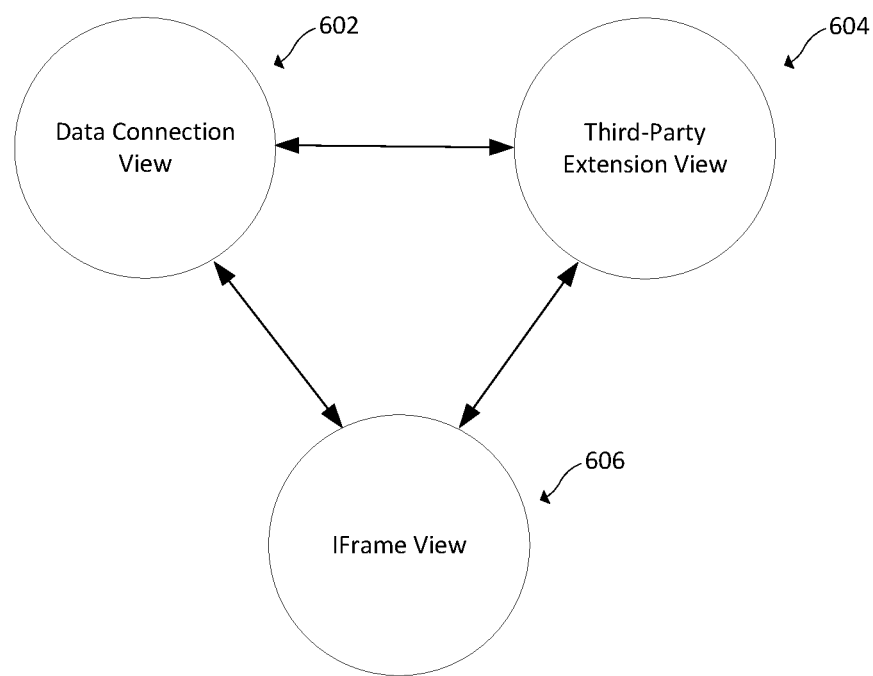
FIG. 6 shows an illustration of the transitions between modes/views that may be enabled by the multi-mode in-context service integration system of FIG. 2.

The multi-mode in-context service integration system enables transitions between the different modes/views enabled by the system without having to leave the context of the host application. For example, data from a third-party service can be transitioned between the various views defined for the third-party service depending on how a user desires to interact with the data from the third-party service. FIG. 6 illustrates the transitions between that may be provided by the system. In embodiments, transitions may be enabled from each mode/view to all the other mode/views, such as shown in FIG. 6. For example, an application may be configured to enable transitions from the data connection view 602 directly to the third-party extension view 604 and to the iFrame view 606, from the third-party extension view 604 directly to the data connection view 602 and the iFrame view 606, and from the iFrame view 606 directly to the data connection view 602 and the third-party extension view 604. In some embodiments, transitions between certain views, e.g., from a data connection view directly to an iFrame view, may not be enabled depending on the application and/or the desires of the developer. Transitions are enabled in any suitable manner. View definitions for data connection views and third-party extension views may include instructions for implementing transition controls within the views and/or within the user interface of the host application. In embodiments, transitions between views are enabled by selectable user interface controls, such as buttons, menu items, etc., provided in the user interface of the host application, and/or in response to predefined user interactions with content of the different views. As one example, clicking on a data item in a data connection view (i.e., first mode of integration) can cause a transition to third party extension view, such as a card view, that enables further functionality for interacting with the data item.

In embodiments, the multi-mode in-context service integration system 200 enables view definitions for different modes of integration for a third-party service to be easily created and implemented using schemas and view definition templates which have been predefined for the third-party service. For example, schemas for different third-party services may be predefined and/or added to the system. View definition templates may also be predefined for third-party services which enable predefined interactions with predetermined data provided by a third-party service.

In embodiments, a data connection view defines a first set of interactions with data from a third-party service, the third-party extension view defines a second set of interactions with data from the third-party service, and the iFrame view defines a third set of interactions with data from the third-party service. The third set of interactions (i.e., iFrame view) corresponds to the full functionality of the third-party service. The first set of interactions (i.e., data connection view) includes interactions that are enabled by data connections between the third-party service and the host application. In embodiments, the second set of interactions (i.e., the third-party extension view) includes interactions which are defined by a predefined schema which has been agreed upon between developers of the third-party service and the host application. In embodiments, the first set of interactions and the second set of interactions are different from each other so that different levels of integration and functionality for interacting with the third-party service may be used depending on the needs and/or desires of the user.

Figure 7:
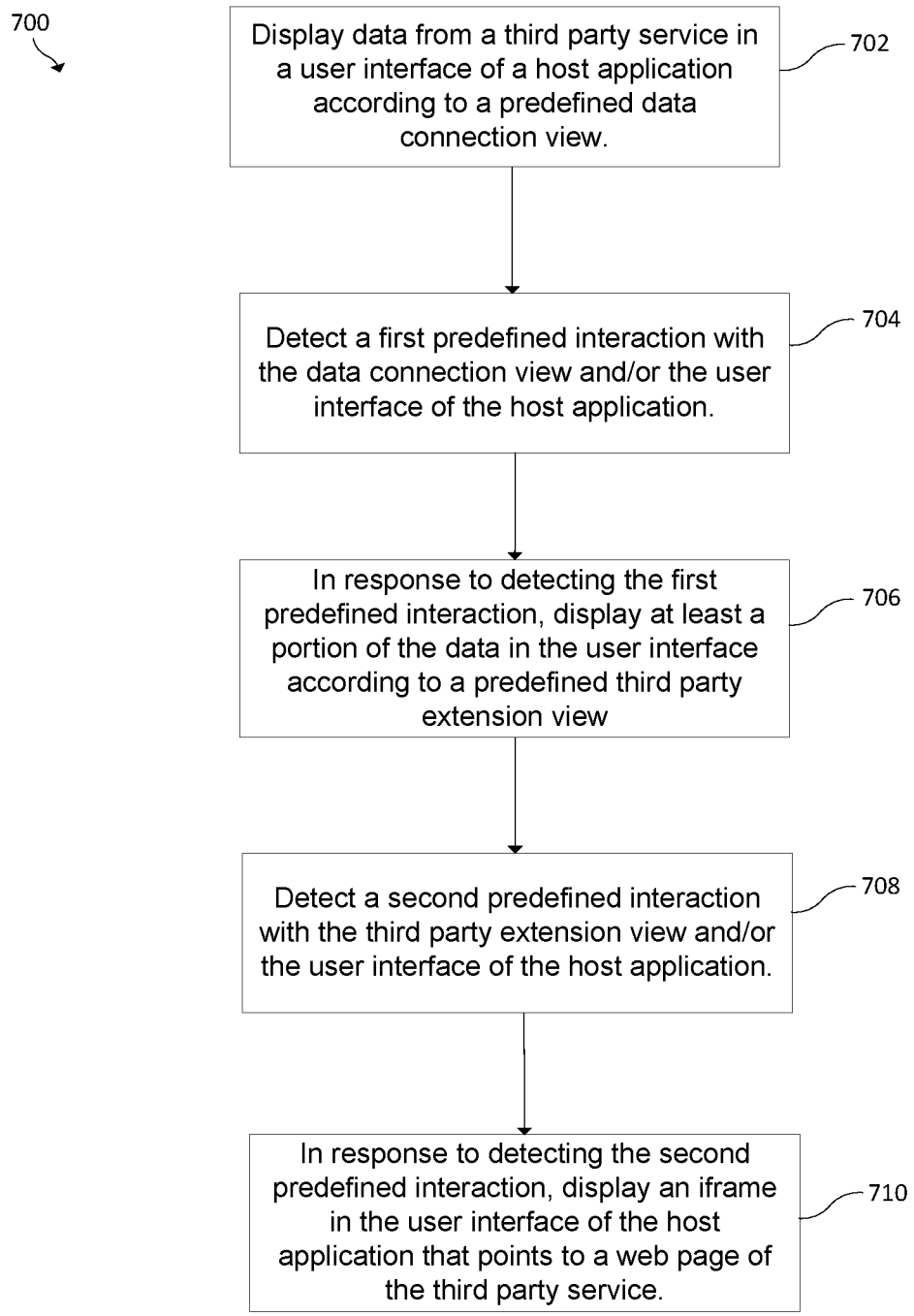
FIG. 7 depicts a flowchart of an example method for integrating a third-party service into a host application with multiple modes of integration in accordance with this disclosure.

An example method 700 for integrating data from a third-party service into a host application is shown in FIG. 7 using a multi-mode in-context service integration system in accordance with this disclosure. The method begins with displaying data from the third-party service in a user interface of the host application according to a predefined data connection view (block 702). The data connection view is implemented based on a data connection view definition that has been predefined for the third-party service. The data connection view definition defines the data from the third-party service to be displayed in the data connection view and at least one element displaying the data in the data connection view within the user interface. The data is retrieved from the third-party service by establishing a data connection between the host application and the third-party service using a data connection module. The data connection may be implemented according to an API for the third-party service. A first predefined interaction with the data connection view and/or the user interface of the host application is detected (block 704). In response to detecting the first predefined interaction, at least a portion of the data is displayed in the user interface according to a predefined third-party extension view (block 706). The third-party extension view is implemented based on a third-party extension view definition that has been predefined for the third-party service. The third-party extension view definition defines the portion of the data to be displayed in the third-party extension view and at least one user interface snippet in which the portion of the data is to be displayed. The portion of the data is retrieved from the third-party service by a third-party extension module. A second predefined interaction with the third-party extension view and/or the user interface of the host application is detected (block 708). In response to detecting the second predefined interaction, an iFrame is incorporated into the user interface of the host application that points to a web page for the third-party service such that the web page is retrieved and rendered within the iFrame (block 710).

Figure 8:
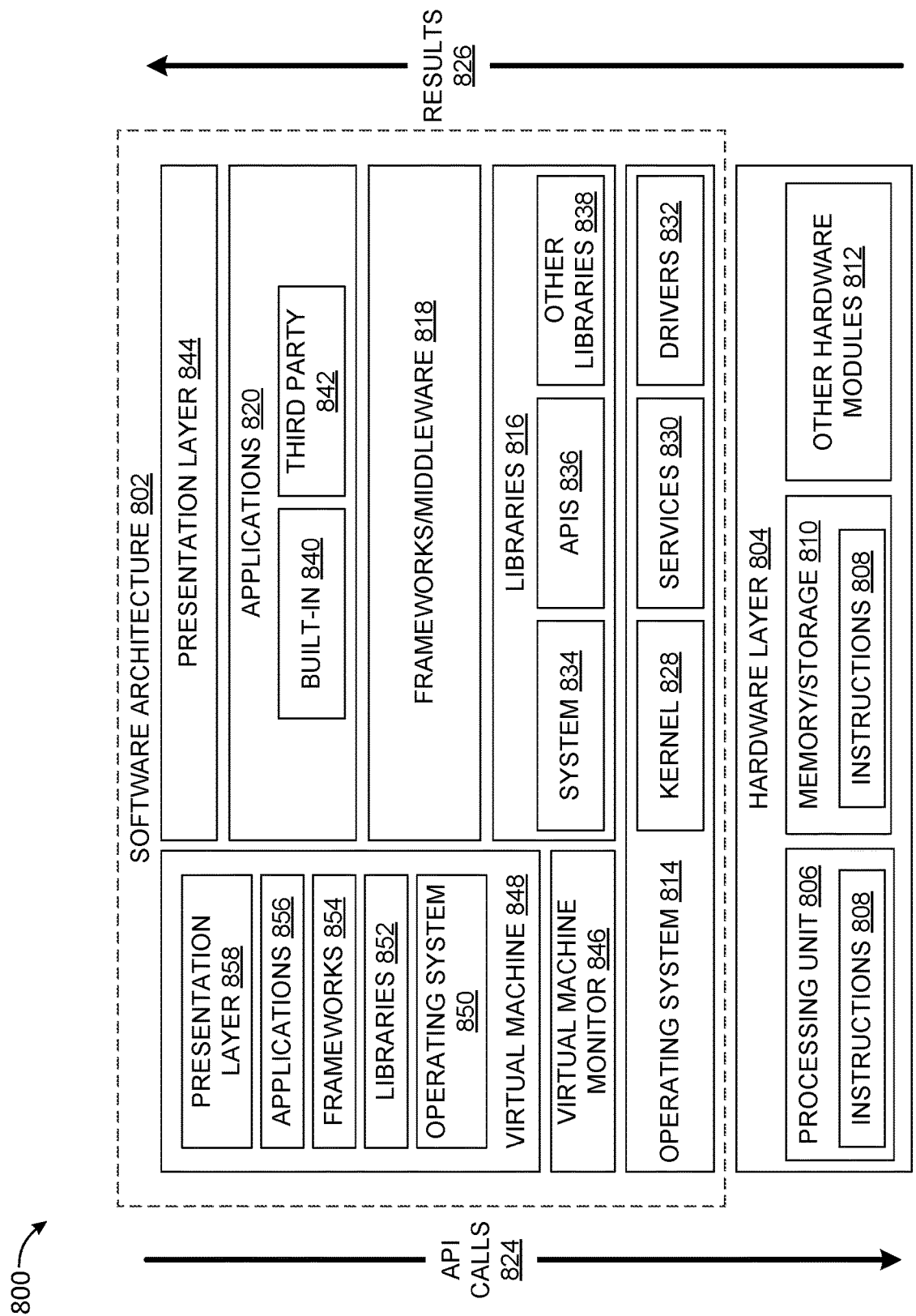
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
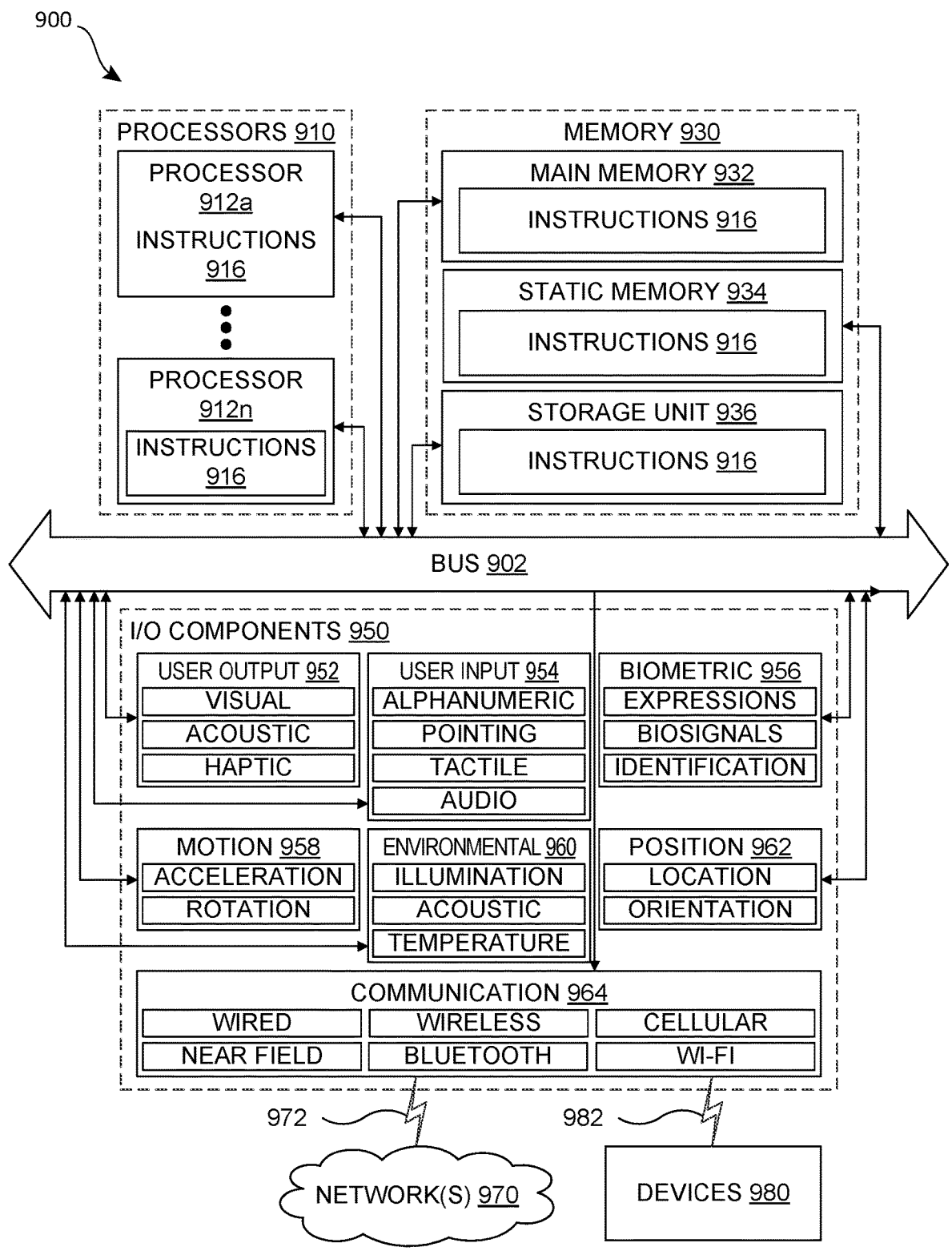
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing system comprising:
- a processor;
- a memory in communication with the processor, the memory comprising executable instructions that, when executed by the processor, cause the data processing system to perform functions of:
  - displaying data from a third-party service in a user interface of a host application according to a predefined data connection view, the data connection view being implemented based on a data connection view definition that has been predefined for the third-party service, the data being retrieved from the third-party service using a data connection between the host application and the third-party service;
  - detecting a first predefined interaction with the data connection view and/or the user interface of the host application;
  - in response to detecting the first predefined interaction, displaying at least a portion of the data in the user interface according to a predefined third-party extension view, the third-party extension view being implemented based on a third-party extension view definition that has been predefined for the third-party service, the third-party extension view definition defining the portion of the data to be displayed in the third-party extension view and at least one user interface snippet in which the portion of the data is to be displayed;
  - detecting a second predefined interaction with the third-party extension view and/or the user interface of the host application; and
  - in response to detecting the second predefined interaction, incorporating an iFrame into the user interface of the host application, the iFrame pointing to a web page for the third-party service such that the web page is retrieved and rendered within the iFrame.

Item 2. The data processing system of item 1, wherein the data connection is established based on an application programming interface (API) of the third-party service.

Item 3. The data processing system of any of items 1-2, wherein a data connection schema is predefined for the third-party service that designates one or more of data types for the data of the third-party service, data attributes for the data of the third-party service, data structures for communicating the data of the third-party service, actions that are allowed to be performed on the data of the third-party service, and controls for invoking the actions, and
wherein the data connection view definition is defined using the data connection schema.

Item 4. The data processing system of any of items 1-3, wherein a third-party extension schema is predefined for the third-party service that designates the one or more of data types for the data of the third-party service, the data attributes for the data of the third-party service, the data structures for communicating the data of the third-party service, the actions that are allowed to be performed on the data of the third-party service, and the controls for invoking the actions, and
wherein the third-party extension view definition is defined using the third-party extension schema.

Item 5. The data processing system of any of items 1-4, wherein the third-party extension schema defines an adaptive card view for displaying and interacting with the portion of the data.

Item 6. The data processing system of any of items 1-5, wherein the first predefined interaction and/or the second predefined interaction corresponds to an activation of a user interface control within the user interface of the host application.

Item 7. The data processing system of any of items 1-6, wherein the data connection view enables a first set of interactions with the data in the data connection view and the third-party extension view enables a second set of interactions with the portion of the data in the third-party extension view, and
wherein the first set of interactions is different than the second set of interactions.

Item 8. The data processing system of any of items 1-7, wherein the data connection view is based on one of a plurality of different data connection view definitions defined for the third-party service, each of the different data connection view definitions defining at least one of different data from the third-party service to be displayed and a different interaction with the data from the third-party service to be displayed.

Item 9. The data processing system of any of items 1-8, wherein the data connection view is based on one of a plurality of different third-party extension view definitions defined for the third-party service, each of the different third-party extension view definitions defining at least one of different data from the third-party service to be displayed and a different interaction with the data from the third-party service to be displayed.

Item 10. The data processing system of any of items 1-9, wherein the functions further comprise:
creating one of the data connection view definition and the third-party extension view definition based on a predefined template for the third-party service.

Item 11. A method for integrating a third-party service into a host application, the method comprising:
- displaying data from a third-party service in a user interface of a host application according to a predefined data connection view, the data connection view being implemented based on a data connection view definition that has been predefined for the third-party service, the data connection view definition defining the data from the third-party service to be displayed in the data connection view and at least one element displaying the data in the data connection view within the user interface, the data being retrieved from the third-party service using a data connection between the host application and the third-party service;
- detecting a first predefined interaction with the data connection view and/or the user interface of the host application; and
- in response to detecting the first predefined interaction, displaying at least a portion of the data in the user interface according to a predefined third-party extension view, the third-party extension view being implemented based on a third-party extension view definition that has been predefined for the third-party service, the third-party extension view definition defining the portion of the data to be displayed in the third-party extension view and at least one user interface snippet in which the portion of the data is to be displayed, the portion of the data being retrieved from the third-party service by a third-party extension module.

Item 12. The method of item 11, further comprising:
detecting a second predefined interaction with the third-party extension view and/or the user interface of the host application; and
in response to detecting the second predefined interaction, incorporating an iFrame into the user interface of the host application, the iFrame pointing to a web page for the third-party service such that the web page is retrieved and rendered within the iFrame.

Item 13. The method of any of items 11-12, further comprising:
establishing the data connection based on an application programming interface (API) of the third-party service.

Item 14. The method of any of items 11-13, wherein a data connection schema is predefined for the third-party service that designates one or more of data types for the data of the third-party service, data attributes for the data of the third-party service, data structures for communicating the data of the third-party service, actions that are allowed to be performed on the data of the third-party service, and controls for invoking the actions, and
wherein the data connection view definition is defined using the data connection schema.

Item 15. The method of any of items 11-14, wherein a third-party extension schema is predefined for the third-party service that designates the one or more of data types for the data of the third-party service, the data attributes for the data of the third-party service, the data structures for communicating the data of the third-party service, the actions that are allowed to be performed on the data of the third-party service, and the controls for invoking the actions, and
wherein the third-party extension view definition is defined using the third-party extension schema.

Item 16. The method of any of items 11-15, wherein the data connection view enables a first set of interactions with the data in the data connection view and the third-party extension view enables a second set of interactions with the portion of the data in the third-party extension view, and
wherein the first set of interactions is different than the second set of interactions.

Item 17. The method of any of items 11-16, wherein the data connection view is based on one of a plurality of different data connection view definitions defined for the third-party service, each of the different data connection view definitions defining at least one of different data from the third-party service to be displayed and a different interaction with the data from the third-party service to be displayed.

Item 18. The method of any of items 11-17, wherein the data connection view is based on one of a plurality of different third-party extension view definitions defined for the third-party service, each of the different third-party extension view definitions defining at least one of different data from the third-party service to be displayed and a different interaction with the data from the third-party service to be displayed.

Item 19. The method of any of items 11-18, further comprising:
creating one of the data connection view definition and the third-party extension view definition based on a predefined template for the third-party service.

Item 20. A non-transitory computer readable medium on which are stored instructions that, when executed, cause a programmable device to perform functions of:
displaying data from a third-party service in a user interface of a host application according to a predefined data connection view, the data connection view being implemented based on a data connection view definition that has been predefined for the third-party service, the data connection view definition defining the data from the third-party service to be displayed in the data connection view and at least one element displaying the data in the data connection view within the user interface, the data being retrieved from the third-party service using a data connection between the host application and the third-party service;
detecting a first predefined interaction with the data connection view and/or the user interface of the host application;
in response to detecting the first predefined interaction, displaying at least a portion of the data in the user interface according to a predefined third-party extension view, the third-party extension view being implemented based on a third-party extension view definition that has been predefined for the third-party service, the third-party extension view definition defining the portion of the data to be displayed in the third-party extension view and at least one user interface snippet in which the portion of the data is to be displayed, the portion of the data being retrieved from the third-party service by a third-party extension module;
detecting a second predefined interaction with the third-party extension view and/or the user interface of the host application; and
in response to detecting the second predefined interaction, incorporating an iFrame into the user interface of the host application, the iFrame pointing to a web page for the third-party service such that the web page is retrieved and rendered within the iFrame.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor;
  a memory in communication with the processor, the memory comprising executable instructions that, when executed by the processor, cause the data processing system to perform functions of:
    displaying data from a third-party service in a user interface of a host application according to a predefined data connection view, the data connection view being implemented based on a data connection view definition that has been predefined for the third-party service, the data being retrieved from the third-party service using a data connection between the host application and the third-party service;
    detecting a first predefined interaction with the data connection view and/or the user interface of the host application;
    in response to detecting the first predefined interaction, replacing the predefined data connection view of the data from the third-party service in the user interface with a predefined third-party extension view which displays at least a portion of the data from the third-party service the third-party extension view being implemented based on a third-party extension view definition that has been predefined for the third-party service,
    the third-party extension view definition defining the portion of the data to be displayed in the third-party extension view and at least one user interface snippet in which the portion of the data is to be displayed;
    detecting a second predefined interaction with the third-party extension view and/or the user interface of the host application; and
    in response to detecting the second predefined interaction, replacing the predefined third-party extension view of the portion of the data in the user interface with an iFrame the iFrame pointing to a web page for the third-party service such that the web page is retrieved and rendered within the iFrame,
    wherein the predefined data connection view of the data from the third-party service and the predefined third-party extension view of the portion of the data are not displayed using an iFrame element; and
    wherein the data connection view definition is defined using a data connection schema.

2. The data processing system of claim 1, wherein the data connection is established based on an application programming interface (API) of the third-party service.

3. The data processing system of claim 1, wherein a data connection schema is predefined for the third-party service that designates one or more data types for the data of the third-party service, data attributes for the data of the third-party service, data structures for communicating the data of the third-party service, actions that are allowed to be performed on the data of the third-party service, and controls for invoking the actions.

4. The data processing system of claim 3, wherein a third-party extension schema is predefined for the third-party service that designates the one or more of data types for the data of the third-party service, the data attributes for the data of the third-party service, the data structures for communicating the data of the third-party service, the actions that are allowed to be performed on the data of the third-party service, and the controls for invoking the actions, and
  wherein the third-party extension view definition is defined using the third-party extension schema.

5. The data processing system of claim 4, wherein the third-party extension schema defines an adaptive card view for displaying and interacting with the portion of the data.

6. The data processing system of claim 1, wherein the first predefined interaction and/or the second predefined interaction corresponds to an activation of a user interface control within the user interface of the host application.

7. The data processing system of claim 1, wherein the data connection view enables a first set of interactions with the data in the data connection view and the third-party extension view enables a second set of interactions with the portion of the data in the third-party extension view, and
  wherein the first set of interactions is different than the second set of interactions.

8. The data processing system of claim 1, wherein the data connection view is based on one of a plurality of different data connection view definitions defined for the third-party service, each of the different data connection view definitions defining at least one of different data from the third-party service to be displayed and a different interaction with the data from the third-party service to be displayed.

9. The data processing system of claim 1, wherein the data connection view is based on one of a plurality of different third-party extension view definitions defined for the third-party service, each of the different third-party extension view definitions defining at least one of different data from the third-party service to be displayed and a different interaction with the data from the third-party service to be displayed.

10. The data processing system of claim 1, wherein the functions further comprise:
creating one of the data connection view definition and the third-party extension view definition based on a predefined template for the third-party service.

11. A method for integrating a third-party service into a host application, the method comprising:
displaying data from a third-party service in a user interface of a host application according to a predefined data connection view, the data connection view being implemented based on a data connection view definition that has been predefined for the third-party service, the data connection view definition defining the data from the third-party service to be displayed in the data connection view and at least one element displaying the data in the data connection view within the user interface,
the data being retrieved from the third-party service using a data connection between the host application and the third-party service;
detecting a first predefined interaction with the data connection view and/or the user interface of the host application; and
in response to detecting the first predefined interaction, replacing the predefined data connection view of the data from the third-party service in the user interface with a predefined third-party extension view which displays at least a portion of the data from the third-party service, the third-party extension view being implemented based on a third-party extension view definition that has been predefined for the third-party service,
the third-party extension view definition defining the portion of the data to be displayed in the third-party extension view and at least one user interface snippet in which the portion of the data is to be displayed, the portion of the data being retrieved from the third-party service by a third-party extension module,
wherein the predefined data connection view of the data from the third-party service and the predefined third-party extension view of the portion of the data are not displayed using an iFrame element; and
wherein the data connection view definition is defined using a data connection schema.

12. The method of claim 11, further comprising:
detecting a second predefined interaction with the third-party extension view and/or the user interface of the host application; and
in response to detecting the second predefined interaction, replacing the predefined third-party extension view of the portion of the data in the user interface with an iFrame, the iFrame pointing to a web page for the third-party service such that the web page is retrieved and rendered within the iFrame.

13. The method of claim 11, further comprising:
establishing the data connection based on an application programming interface (API) of the third-party service.

14. The method of claim 11, wherein a data connection schema is predefined for the third-party service that designates one or more of data types for the data of the third-party service, data attributes for the data of the third-party service, data structures for communicating the data of the third-party service, actions that are allowed to be performed on the data of the third-party service, and controls for invoking the actions.

15. The method of claim 14, wherein a third-party extension schema is predefined for the third-party service that designates the one or more of data types for the data of the third-party service, the data attributes for the data of the third-party service, the data structures for communicating the data of the third-party service, the actions that are allowed to be performed on the data of the third-party service, and the controls for invoking the actions, and
wherein the third-party extension view definition is defined using the third-party extension schema.

16. The method of claim 11, wherein the data connection view enables a first set of interactions with the data in the data connection view and the third-party extension view enables a second set of interactions with the portion of the data in the third-party extension view, and
wherein the first set of interactions is different than the second set of interactions.

17. The method of claim 11, wherein the data connection view is based on one of a plurality of different data connection view definitions defined for the third-party service, each of the different data connection view definitions defining at least one of different data from the third-party service to be displayed and a different interaction with the data from the third-party service to be displayed.

18. The method of claim 11, wherein the data connection view is based on one of a plurality of different third-party extension view definitions defined for the third-party service, each of the different third-party extension view definitions defining at least one of different data from the third-party service to be displayed and a different interaction with the data from the third-party service to be displayed.

19. The method of claim 11, further comprising:
creating one of the data connection view definition and the third-party extension view definition based on a predefined template for the third-party service.

20. A non-transitory computer readable medium on which are stored instructions that, when executed, cause a programmable device to perform functions of:
displaying data from a third-party service in a user interface of a host application according to a predefined data connection view,
the data connection view being implemented based on a data connection view definition that has been predefined for the third-party service, the data connection view definition defining the data from the third-party service to be displayed in the data connection view and at least one element displaying the data in the data connection view within the user interface, the data being retrieved from the third-party service using a data connection between the host application and the third-party service;
detecting a first predefined interaction with the data connection view and/or the user interface of the host application;
in response to detecting the first predefined interaction, replacing the predefined data connection view of the data from the third-party service in the user interface with a predefined third-party extension view which displays at least a portion of the data from the third-party service, the third-party extension view being implemented based on a third-party extension view definition that has been predefined for the third-party service, the third-party extension view definition defining the portion of the data to be displayed in the third-party extension view and at least one user interface snippet in which the portion of the data is to be displayed, the portion of the data being retrieved from the third-party service by a third-party extension module;

detecting a second predefined interaction with the third-party extension view and/or the user interface of the host application; and in response to detecting the second predefined interaction, replacing the predefined third-party extension view of the portion of the data in the user interface with an iFrame, the iFrame pointing to a web page for the third-party service such that the web page is retrieved and rendered within the iFrame, wherein the predefined data connection view of the data from the third-party service and the predefined third-party extension view of the portion of the data are not displayed using an iFrame element, and wherein the data connection view definition is defined using a data connection schema.

* * * * *